(12) United States Patent
Iwasaki

(10) Patent No.: US 11,487,074 B2
(45) Date of Patent: Nov. 1, 2022

(54) LENS APPARATUS, AND METHOD OF ESTIMATING TEMPERATURE OF LENS

(71) Applicant: CANON KABUSHIKI KAISHA, Tokyo (JP)

(72) Inventor: Yuma Iwasaki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 238 days.

(21) Appl. No.: 16/691,717

(22) Filed: Nov. 22, 2019

(65) Prior Publication Data

US 2020/0166825 A1 May 28, 2020

(30) Foreign Application Priority Data

Nov. 28, 2018 (JP) .............................. JP2018-222455

(51) Int. Cl.
*G02B 7/02* (2021.01)
*G03B 13/36* (2021.01)
*H04N 5/232* (2006.01)

(52) U.S. Cl.
CPC .............. *G02B 7/028* (2013.01); *G03B 13/36* (2013.01); *H04N 5/23212* (2013.01)

(58) Field of Classification Search
CPC .......... G03B 13/36; G03B 7/22; G02B 7/008; G02B 7/028; H04N 5/23212
See application file for complete search history.

(56) References Cited

U.S. PATENT DOCUMENTS

2017/0343765 A1* 11/2017 Maruyama ............. G02B 7/023
2019/0187403 A1 6/2019 Wada

FOREIGN PATENT DOCUMENTS

| JP | H05103255 A | * | 4/1993 |
| JP | 2017215574 A | | 12/2017 |
| WO | 2018042759 A1 | | 3/2018 |

* cited by examiner

*Primary Examiner* — Clayton E. LaBalle
*Assistant Examiner* — Fang-Chi Chang
(74) *Attorney, Agent, or Firm* — Rossi, Kimms & McDowell, LLP

(57) ABSTRACT

Provided is a lens apparatus including: a lens; detectors configured to detect temperatures at a plurality of mutually different positions of the lens apparatus, respectively; and a processor configured to obtain a change amount of a temperature per unit time with respect to each of the plurality of mutually different positions based on each of the detected temperatures and a time at which each of the detected temperatures is obtained, to estimate a temperature of the lens based on the change amount with respect to each of the plurality of mutually different positions.

8 Claims, 9 Drawing Sheets

FIG. 7

| AREA | ACTUAL TEMPERATURE CHANGE RATE $\alpha_m(t)$ | α WHEN OBTAINED $C_i$ | APPROXIMATION COEFFICIENT $C_i$ | |
|---|---|---|---|---|
| ... | ... | | | |
| A | 40 - 50 | 45 | $C_{1A}$ | $C_{2A}$ |
| B | 30 - 40 | 35 | $C_{1B}$ | $C_{2B}$ |
| C | 20 - 30 | 25 | $C_{1C}$ | $C_{2C}$ |
| ... | ... | | | |

LENS APPARATUS, AND METHOD OF ESTIMATING TEMPERATURE OF LENS

BACKGROUND OF THE INVENTION

Field of the Invention

The present invention relates to a lens apparatus, and a method of estimating a temperature of a lens.

Description of the Related Art

Hitherto, expansion or contraction of a lens caused by a change in temperature is known to be a cause of focus deviation in a lens apparatus. A broadcasting zoom lens includes a so-called flange back adjustment mechanism for correcting the focus deviation, and can maintain appropriate focus through fine adjustment of the flange back adjustment mechanism according to a camera for use. Further, the focus deviation can be corrected through grasping a temperature of a lens having a high ratio (sensitivity) of the focus deviation with respect to a temperature change, calculating a focus deviation amount based on the temperature change, and controlling the flange back adjustment mechanism based on the focus deviation amount.

In International Publication No. WO2018/042759, there is disclosed providing a member having the same specific heat and mass with a target lens, of which a temperature is to be estimated, outside a lens barrel, and estimating the temperature of the lens based on a difference between a temperature of the member and a temperature at a different point of the lens barrel.

The estimation in International Publication No. WO2018/042759 may be inaccurate because only the difference in temperature between the members is used for the estimation, although a time delay may occur in transfer of the temperature between members when an ambient temperature repeats fluctuating up and down. Therefore, correction of the focus deviation based on the estimation may also be inaccurate.

SUMMARY OF THE INVENTION

An aspect of embodiments provides, for example, a lens apparatus beneficial in estimating a temperature of a lens included therein.

A lens apparatus according to at least one embodiment of the present invention includes: a lens; detectors configured to detect temperatures at a plurality of mutually different positions of the lens apparatus, respectively; and a processor configured to obtain a change amount of a temperature per unit time with respect to each of the plurality of mutually different positions based on each of the detected temperatures and a time at which each of the detected temperatures is obtained, to estimate a temperature of the lens based on the change amount with respect to each of the plurality of mutually different positions.

Further features of the present invention will become apparent from the following description of exemplary embodiments with reference to the attached drawings.

BRIEF DESCRIPTION OF THE DRAWINGS

FIG. 7 is a diagram for illustrating an example of area division for an approximation coefficient $C_i$ in Embodiment 3.

DESCRIPTION OF THE EMBODIMENTS

Embodiment 1

Hereinafter, a lens apparatus and a method of estimating a temperature of a lens in the lens apparatus according to exemplary embodiments of the present invention are described in detail with reference to the accompanying drawings.

Figure 1:
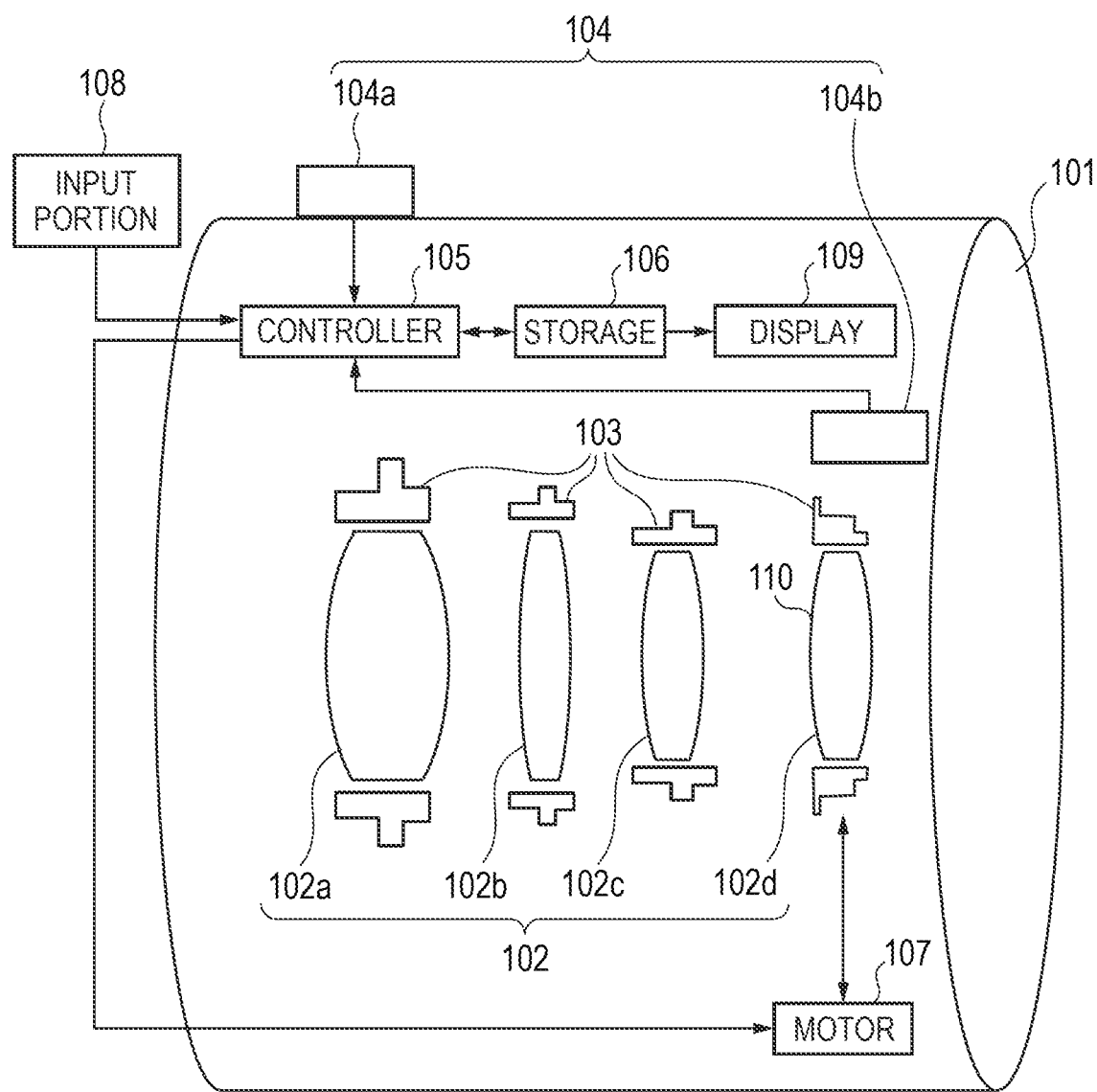
FIG. 1 is a diagram for illustrating a configuration example of a lens apparatus according to Embodiment 1 of the present invention.

FIG. 1 is a diagram for illustrating an example of a basic configuration of a lens apparatus 101 according to at least one embodiment of the present invention. In Embodiment 1 of the present invention, a configuration in which a lens is detachable from an image pickup apparatus is described as an example, but a configuration in which the lens is integrated with the image pickup apparatus may be adopted.

The lens apparatus 101 includes a plurality of lens units 102, lens barrels 103 configured to hold the lens units 102, temperature detectors 104, a controller 105, a storage 106, and a motor 107. The lens units 102 include a focus lens 102a, a variator lens 102b, a compensator lens 102c, and a relay lens 102d. The focus lens 102a is a lens used to focus on an object. The variator lens 102b is a lens used to change a focal length. Further, the compensator lens 102c is a lens used to correct focus deviation caused by the change in focal length in conjunction with the variator lens 102b. The relay lens 102d is a lens that is located at the end of the lens units 102, and is used to form an image on an image pickup surface. When the lens apparatus 101 is connected to various image pickup apparatus, a back focus is changed depending on the image pickup apparatus. Therefore, the relay lens 102d is moved in an optical axis direction to adjust a distance to the image pickup surface, to thereby perform flange back initial adjustment to a position of appropriate focus before taking an image. At the time of adjustment, torque of the motor 107 may be converted into straightforward movement of the relay lens 102d by a cam mechanism (not shown), or a mechanism configured to allow manual movement by an external operation may be provided.

In Embodiment 1, a method of correcting focus deviation caused by a temperature change is described. When an environmental temperature around the lens apparatus 101 is changed, heat is transferred to the lens units 102 and support members by heat conduction, thermal radiation, or thermal convection between members forming the lens apparatus 101 to change temperatures of the lens units 102 and the support members. Time required for the temperature change is different depending on a material, a distance from a heat source, and other factors of the member, and it is generally known that a temperature difference is generated between the members. In Embodiment 1, a lens located inside the lens apparatus 101 is affected after a delay of a certain time by the change in surrounding environmental temperature. In order to grasp a focus deviation amount, it is desired to detect a temperature at all times by attaching a temperature sensor directly to the lens. However, with the lens being generally placed on an optical path, it is required to place the temperature sensor at a position at which no shadow is cast on the optical path, and it is difficult to attach the temperature sensor directly to the lens for the detection. Further, even when the temperature of the lens is directly detected, the lens apparatus 101 is complicated and upsized as a result, and it is not always easy. To address this problem, the temperature detectors 104 are placed at positions away from the lens, the temperature of the lens is estimated based on acquired temperature information, and focus deviation is corrected based on the estimated temperature. Of a plurality of lenses in the lens units 102, a lens of which a temperature is to be estimated is referred to as a "target lens 110" in this specification. In Embodiment 1, the number of target lenses 110 is described as being one. However, the present invention is not limited thereto, and a plurality of target lenses 110 may be set as targets for estimating temperatures. When there are a plurality of target lenses 110, a focus deviation correction amount may be calculated for each lens, and a weighted average may be calculated according to a magnitude of focus deviation sensitivity, for example, to calculate a total focus deviation correction amount, with the result that high focus deviation correction accuracy is obtained. Further, when a lens having high focus deviation sensitivity to the temperature change is selected as the target lens 110 from among the lens units 102, a movement amount of the target lens 110 during focus deviation correction can be reduced.

When power is supplied to the lens apparatus 101, the temperature detectors 104 acquire data of temperatures at placement positions and time at every predetermined time, and transfer the data to the controller 105. As an acquisition interval Δt of temperature data becomes shorter, a finer temperature change around the lens apparatus 101 can be captured to enable accurate temperature estimation. Further, with the temperature detectors 104 always acquiring data even when no power is supplied to the lens apparatus 101, the temperature of the target lens 110 is estimated even when no image is taken, and appropriate focus deviation correction can be performed when an image is taken.

In Embodiment 1, a temperature detector (first detector) 104a configured to detect a temperature (first temperature) of outside air or one or more positions close to the outside air, and a temperature detector (second detector) 104b configured to detect a position that is close to the target lens 110 in position and temperature change rate (time derivative of temperature) are placed at one or more positions. The temperature detector 104a is placed at a place at which an ambient temperature of the lens apparatus, or a temperature of, or close to, an outer peripheral surface of the lens apparatus can be detected. It is only required that the temperature detectors 104 be placed at two or more positions, and when the number of temperature detectors 104b is increased, accuracy of estimating temperatures of the plurality of target lenses 110 can be increased.

Figure 2:
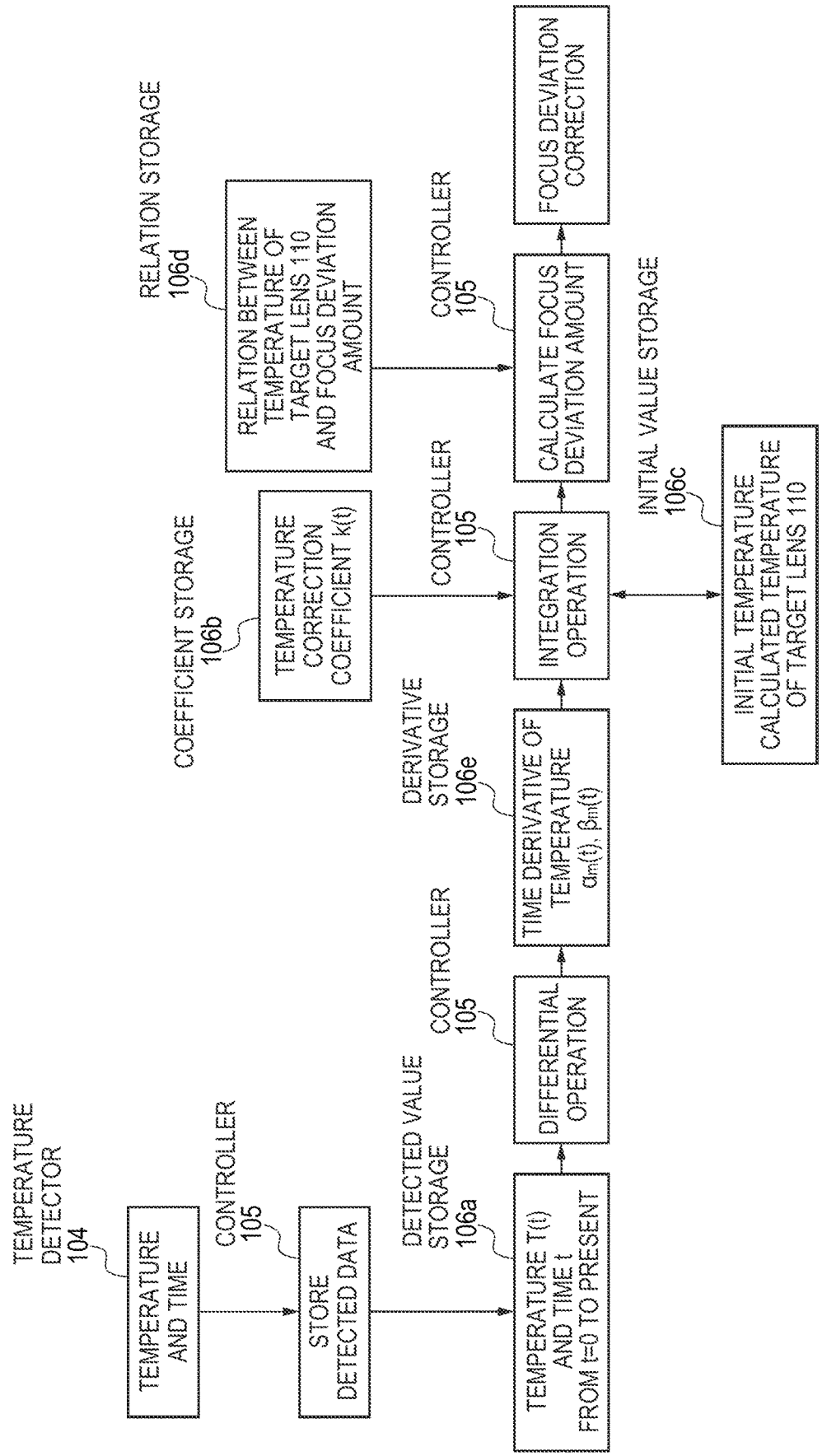
FIG. 2 is a diagram for illustrating a flow of transmission and reception of data up to focus deviation correction in Embodiment 1.

FIG. 2 is a diagram for illustrating a flow of transmission and reception of data up to focus deviation correction focusing attention on the temperature detectors 104, the controller 105, and the storage 106. The storage 106 includes a detected value storage 106a, a coefficient storage 106b, a relation storage 106d, an initial value storage 106c, and a derivative storage 106e. The detected value storage 106a is configured to receive from the controller 105 and store a temperature T(t) at a time "t" and the time "t". The coefficient storage 106b is configured to grasp in advance and store the temperature detectors 104 and a temperature characteristic of the target lens 110. The temperature characteristic is expressed as a temperature correction coefficient "k(t)". The relation storage 106d is configured to store relation between the temperature of the target lens 110 and the focus deviation amount.

Now, the temperature correction coefficient "k(t)" as the temperature characteristic is described. The temperature correction coefficient "k(t)" is acquired in advance by an experiment or numerical analysis, for example, and is stored in the coefficient storage 106b. The lens apparatus 101 is stopped for a sufficiently long time to set temperatures of members forming the lens apparatus 101 to steady states. When the ambient temperature is changed at a constant temperature change rate (change amount of temperature per unit time, first temperature change rate) "α" from a state in which temperatures of the lens apparatus 101 and the outside air are the same (time t=0), a temperature change rate (second temperature change rate) β(t) of a temperature (second temperature) detected at the placement position of the temperature detector 104b and a temperature change rate (lens temperature change rate) "γ(t)" of the target lens 110 at an elapsed time "t" are expressed as functions of time. A coefficient obtained by standardizing, with the temperature change rate "α" of the ambient temperature, temporal progression of the temperature change rate β(t) at the placement position of the temperature detector 104b and the temperature change rate "γ(t)" of the target lens 110 is defined as the temperature correction coefficient "k(t)", and is expressed as Expression (1). Further, in order to increase accuracy of the temperature correction coefficient "k(t)" for various temperature change rates "α" of the ambient temperature, a plurality of temperature correction coefficients "k(t)" may be generated with different conditions of the temperature change rate "α" of the ambient temperature. Further, in order to reduce computational load, the temperature correction coefficients "k(t)" may be configured to be held as, and read from, a table.

$$k(t) = \frac{\beta(t) - \gamma(t)}{\alpha} \tag{1}$$

Next, a procedure of calculating the temperature of the target lens 110 in a real environment is described. The relay lens 102d is moved to a position of appropriate focus, and the flange back initial adjustment is performed. A temperature at this time is set as an initial value, and is stored in the initial value storage 106c. The controller 105 stores information (detection result) on present temperatures and present time acquired (detected) by the temperature detector 104a and the temperature detector 104b in the detected value storage 106a. Data on temperatures and times from past to present, which is stored in the detected value storage 106a, is called, and the time derivative of temperature is calculated as needed by the controller 105, and is stored in the derivative storage 106e. The time derivative of temperature calculated here always fluctuates with the progression of time in the real environment. In a case where the acquisition interval Δt of the temperature data is small, when a gradient is calculated with the use of the present temperature and the previous temperature at the time of calculating the time derivative of temperature, an error may become large. In order to reduce the error, the time derivative of temperature may be calculated by approximation after a certain number of pieces of the temperature data are accumulated. A temperature change rate at the time "t" at the placement position of the temperature detector 104a is represented by "$\alpha_m(t)$", and a temperature change rate at the time "t" at the placement position of the temperature detector 104b is represented by "$\beta_m(t)$". An integration operation is performed by the controller 105 with the use of the time derivatives of temperature, the temperature correction coefficient "k(t)" stored in the coefficient storage 106b, and the initial temperature stored in the initial value storage 106c. The temperature T(t) of the target lens 110 at a given time "t" can be calculated by Expression (2) with the initial temperature being set to $T_0$.

$$T(t)=\int(\beta_m(t)-\alpha_m(t)\times k(t))dt+T_0 \quad (2)$$

Through use of the temperature correction coefficient "k(t)" according to the temperature change rate "$\alpha_m(t)$" of the ambient temperature for the temperature change rate "$\beta_m(t)$" at the placement position of the temperature detector 104b, accurate temperature estimation can be performed. Further, the calculated temperature of the target lens 110 at the given time "t" is stored in the initial value storage 106c. When the temperature change rate "$\alpha_m(t)$" of the ambient temperature is changed significantly in the course, in order to reduce an error, a difference value of temperature change rates "$\alpha_m(t)$" before and after the change may be used as "$\alpha_m(t)$" in Expression (2).

In the above-mentioned configuration, the controller 105 receives the present temperatures and the present time from the temperature detectors 104. Further, the controller 105 (processor) receives the temperatures and the times from the past to the present from the detected value storage 106a, the above-mentioned temperature correction coefficient "k(t)" from the storage 106b, the time derivative of temperature from the derivative storage 106e, and a result of integration from the initial value storage 106c to calculate the temperature of the target lens 110. Based on the calculated temperature of the target lens 110, and the relation between the temperature of the target lens 110 and the focus deviation amount stored in the storage 106d, a correction amount (drive amount) for the focus deviation caused by the temperature change is calculated by the controller 105. The motor 107 drives the relay lens 102d by the focus deviation correction amount based on the instruction from the controller 105 to correct the focus deviation. Further, while a calculated total movement amount of focus deviation is small, and the focus deviation cannot be found in an image when the image is to be actually taken, flange back adjustment may not be performed. For example, the flange back adjustment may be performed only when there is an amount of focus deviation that is larger than a depth of focus of the lens apparatus 101 from a state in which the flange back adjustment was performed last.

Further, there may also be considered a possibility that the lens apparatus 101 is used without intentionally correcting the focus deviation caused by the temperature change, and hence an input portion 108 with which a user can freely select whether or not to perform focus deviation correction may also be provided. The controller 105 switches whether or not to perform focus deviation correction depending on an input from the input portion 108. In order for the user to easily recognize a usage environment of the lens apparatus 101, a display 109 configured to read from the storage 106 and display present temperatures at the placement positions of the temperature detectors 104, the time derivative of temperature, an estimated temperature of the target lens 110 and the focus deviation correction amount may be provided.

Figure 3:
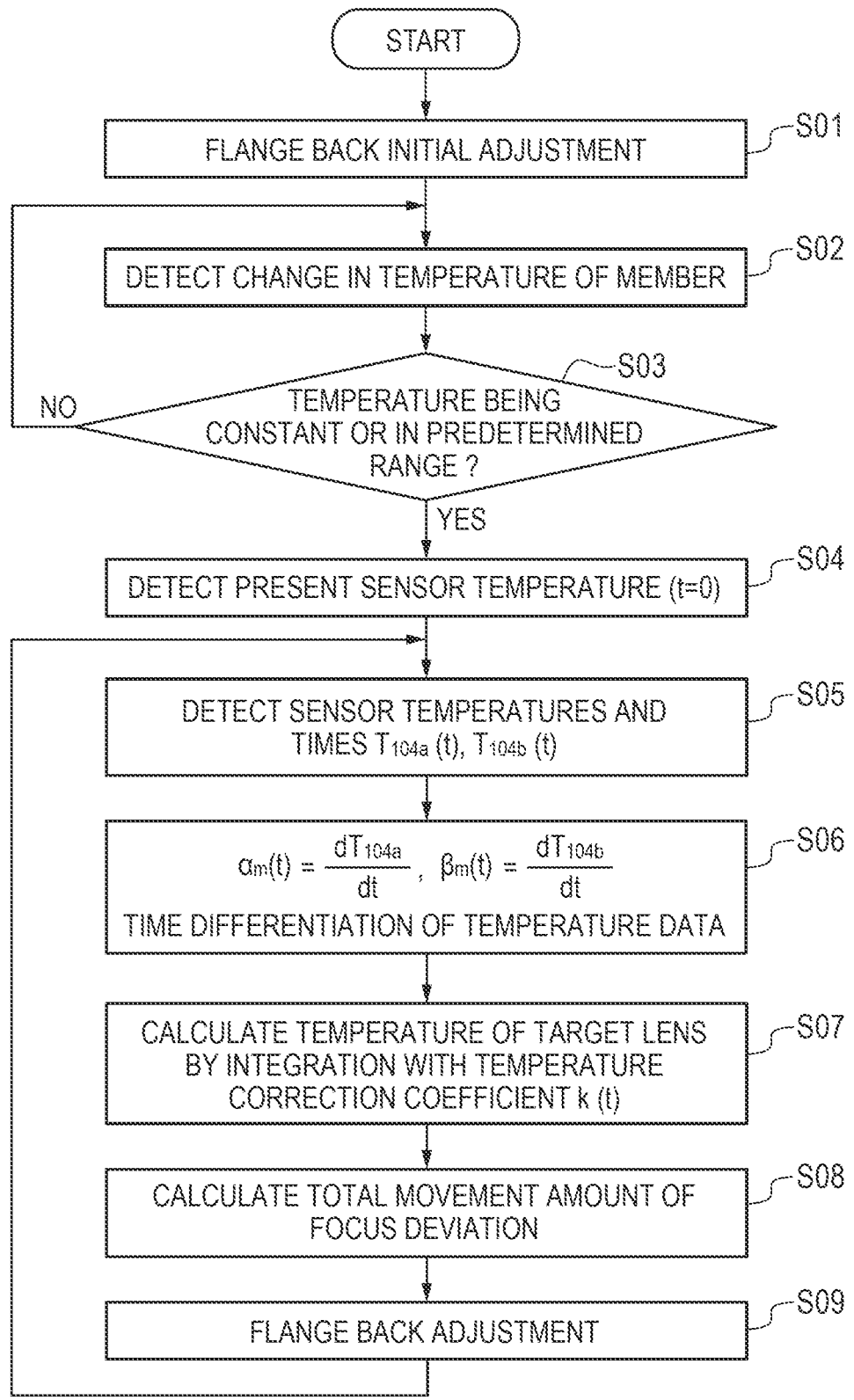
FIG. 3 is a flow chart for illustrating a flow of focus deviation correction processing in Embodiment 1.

Now, with reference to FIG. 3, a function of estimating the temperature of the target lens 110 at the given time "t" based on the temperature correction coefficient "k(t)" and the temperatures detected by the temperature detectors 104 for the flange back adjustment is described. In Step S01, the relay lens 102d is moved to the position of appropriate focus to perform the flange back initial adjustment. Before the detection is started, the lens apparatus 101 is in a stopped state for a sufficiently long time, and a temperature of a member inside the lens apparatus 101 is in a state of being constant and stable. In Step S02, after the lens apparatus 101 is stopped for the sufficiently long time, temperatures are acquired at certain intervals by the temperature detectors 104. It is checked in Step S03 that a temperature at the same point is constant (or in a predetermined range). The temperature at this time is set as an initial value, and is stored in the initial value storage 106c in Step S04.

Temperatures detected by the temperature detector 104a and the temperature detector 104b are represented by $T_{104a}$ and $T_{104b}$, respectively, and the detected temperatures and times are stored in the storage 106a as needed in Step S05. In Step S06, the acquired temperatures and times are sent to the controller 105, and the time derivative of temperature is calculated. With the use of the time derivative of temperature, the temperature correction coefficient "k(t)" stored in the storage 106b, and previous calculation results stored in the initial value storage 106c, the integration operation is performed in Step S07. The temperature T(t) of the target lens 110 at the given time "t" can be calculated by Expression (2). As described above, with the use of the temperature correction coefficient "k(t)" according to the temperature change rate "$\alpha_m(t)$" of the ambient temperature for the temperature change rate "$\beta_m(t)$" at the placement position of the temperature detector 104b, accurate temperature estimation can be performed. Further, the calculated temperature T(t) of the target lens 110 at the Liven time "t" is stored in the initial value storage 106c.

In Step S08, temperature information of the target lens 110 stored in the initial value storage 106c and the relation of the focus deviation amount stored in the storage 106d are read to calculate the focus deviation correction amount. When there are a plurality of target lenses 110, the focus deviation correction amount is calculated for each lens, and the total focus deviation correction amount is calculated taking the magnitude of the focus deviation sensitivity into consideration. In Step S09, the motor 107 is driven to move the relay lens 102d by the focus deviation correction amount in accordance with an instruction from the controller 105 to perform focus deviation correction. The processing of Steps S05 to S09 is executed for each acquisition interval Δt of the temperature data.

With the above-mentioned processing, in Embodiment 1, the temperature of the lens having the high focus deviation sensitivity to the temperature change is grasped appropriately at all times, and the focus deviation amount is calculated to enable appropriate focus deviation correction.

Embodiment 2

Figure 4:
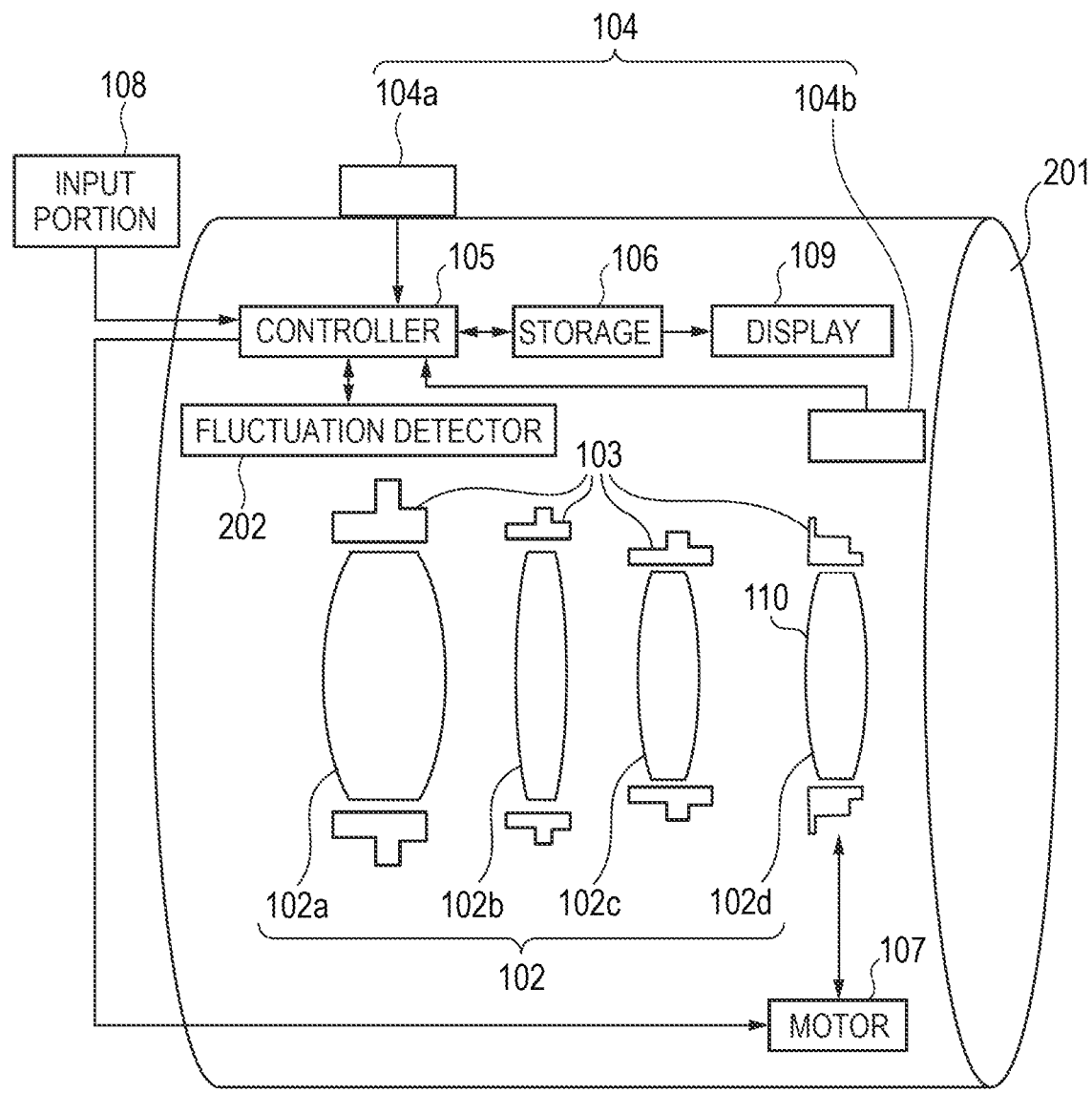
FIG. 4 is a diagram for illustrating a configuration example of a lens apparatus according to Embodiment 2 of the present invention.

Now, with reference to FIG. 4, a lens apparatus 201 according to Embodiment 2 of the present invention is described. Matters not referred to here are the same as in Embodiment 1, and a description thereof is omitted.

The lens apparatus 201 according to Embodiment 2 includes, in addition to the lens apparatus 101, a fluctuation detector 202 configured to detect a change in temperature change rate of the ambient temperature in the course. In order to increase accuracy of the temperature correction coefficient "k(t)" for various temperature change rates "α" of the ambient temperature, a plurality of temperature correction coefficients "k(t)" are generated with different conditions of the temperature change rate "α" of the ambient temperature. The temperature change rates of the ambient temperature under the usage environment of the lens apparatus 201 are divided into areas depending on their magnitudes, and the temperature correction coefficient "k(t)" is changed according to the area in which the temperature change rate of the ambient temperature at the time when the image is to be actually taken is included.

In the derivative storage 106e, data of time derivatives of temperature from when the lens apparatus 201 is powered on (t=0) to the elapsed time "t" is stored. The fluctuation detector 202 calculates a difference between a previous temperature change rate and a present temperature change rate, and detects that the temperature change rate of the ambient temperature has changed at a timing when the difference exceeds a predetermined value. When the change in temperature change rate is detected by the fluctuation detector 202, the temperature correction coefficient "k(t)" is changed to a coefficient suitable for the temperature change rate "$\alpha_m(t)$" at the present ambient temperature, and an integration interval is updated to perform the integration operation. At this time, a previous temperature estimation result of the target lens 110 is used as an initial value ($T_0$) in the integration operation. Further, an initial value of the present integration interval is represented by "$\tau_i$", and an initial value of an integration interval before the update is represented by "$\tau_{i-1}$". With a temperature correction coefficient k(t−τ), a temperature correction coefficient k(0) is used at time t=$\tau_i$ when the temperature change rate "$\alpha_m(t)$" of the ambient temperature is changed, and a change after the temperature change rate "$\alpha_m(t)$" of the ambient temperature starts to change can be tracked accurately. The temperature T(t) of the target lens 110 at the given time "t" can be calculated by Expression (3).

$$T(t)=\Sigma_{i=0}\int_{\tau_i}^{\tau_{i+1}}(\beta_m(t)-\alpha_m(t)\times k(t-\tau_i))dt+T_0 \quad (3)$$

Figure 5:
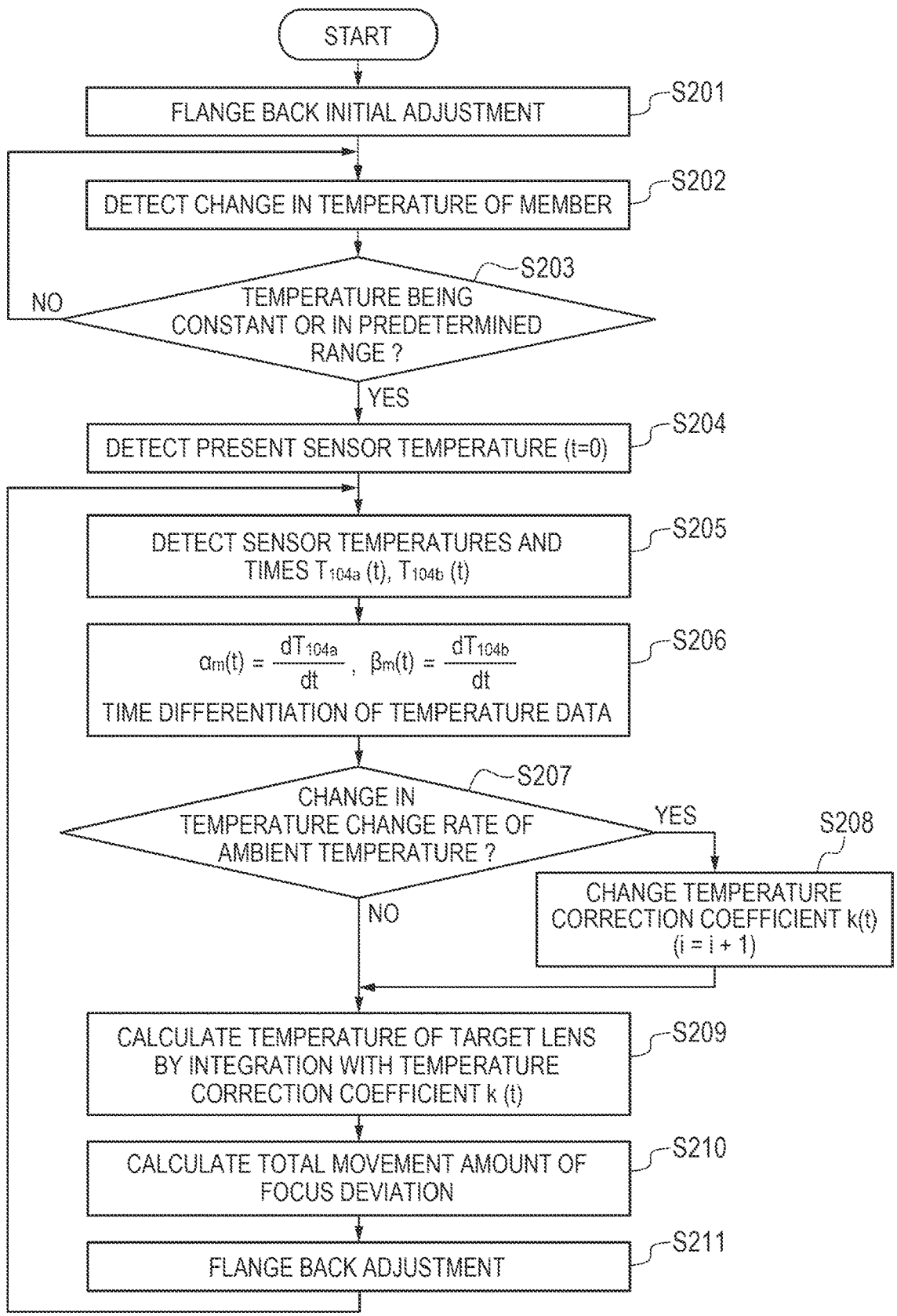
FIG. 5 is a flow chart for illustrating a flow of focus deviation correction processing in Embodiment 2.

Now, with reference to FIG. 5, a function of estimating the temperature of the target lens 110 at the given time "t" based on a result of the detection by the above-mentioned fluctuation detector 202, the above-mentioned temperature correction coefficient "k(t)" and the temperatures detected by the temperature detectors 104 for the flange back adjustment is described.

Steps S201 to S206 are the same as in Embodiment 1 described with reference to FIG. 3, and hence a description thereof is omitted.

In Step S207, the fluctuation detector 202 receives the time derivative of temperature from the derivative storage 106e, calculates a difference between past temperature change rates and the present temperature change rate, and detects that the temperature change rate of the ambient temperature has changed at the timing when the difference exceeds a predetermined value. When the change in temperature change rate is detected by the fluctuation detector 202, the temperature correction coefficient "k(t)" is changed to a temperature correction coefficient "k(t)" suitable for the temperature change rate "$\alpha_m(t)$" at the present ambient temperature in Step S208. Further, i+1 is substituted for "i" in Expression (3) to update the integration interval. In Step S209, the changed temperature correction coefficient "k(t)" is used to perform the integration operation, to thereby calculate the temperature of the target lens 110. The processing of Steps S210 and S211 is the same as in Embodiment 1, and a description thereof is omitted.

In Embodiment 2, through appropriate reflection of the change in temperature change rate of the ambient temperature as needed, when the temperature change rate of the ambient temperature is changed significantly, accurate temperature estimation can be performed.

Embodiment 3

Figure 6:
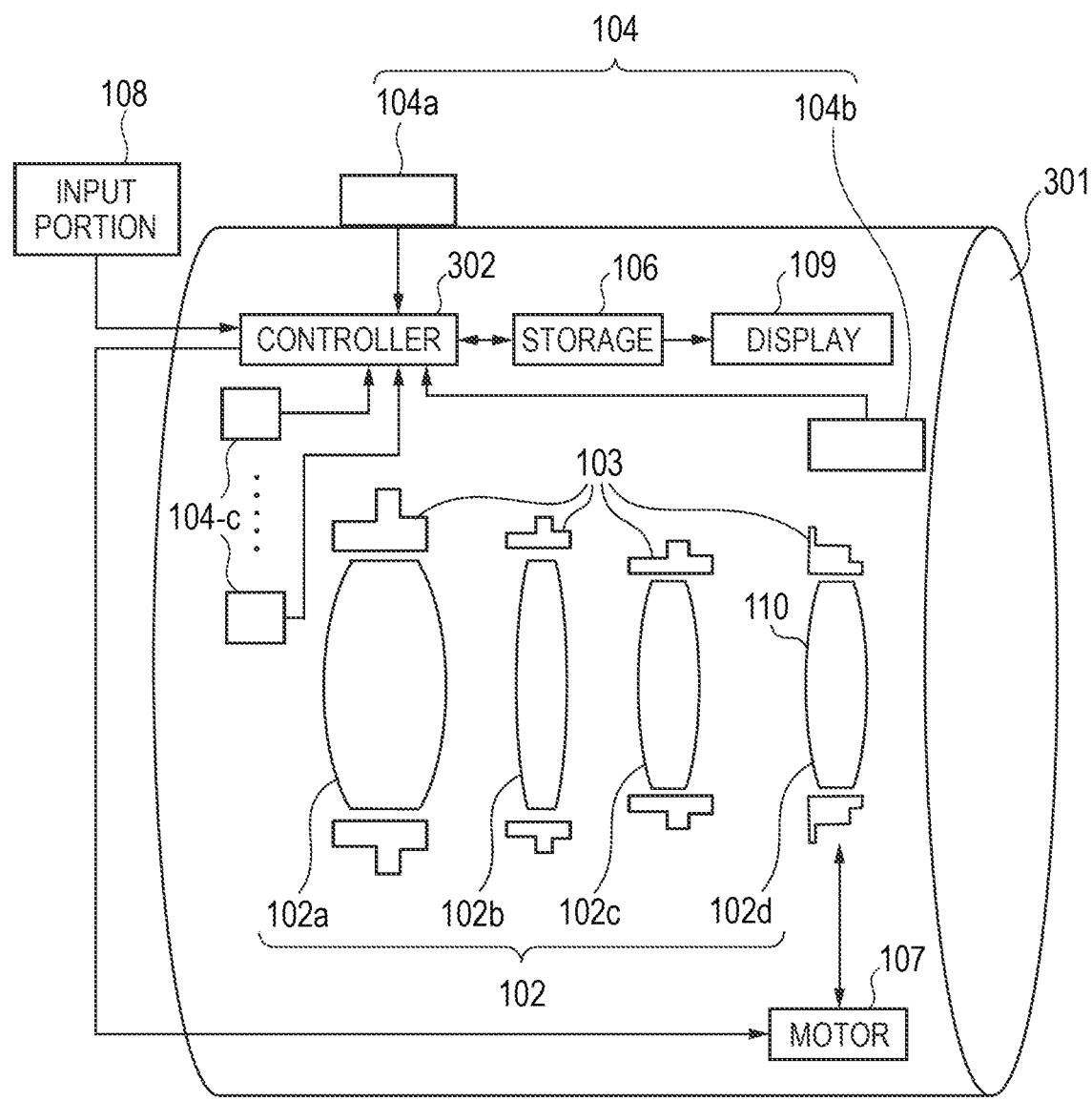
FIG. 6 is a diagram for illustrating a configuration example of a lens apparatus according to Embodiment 3 of the present invention.

Now, with reference to FIG. 6, a lens apparatus 301 according to Embodiment 3 of the present invention is described. Matters not referred to here are the same as in Embodiment 1 and Embodiment 2, and a description thereof is omitted.

In Embodiment 3, a case in which a plurality of temperature detectors 104c are provided is described. Further, in addition to the function of the controller 105, there is provided a controller 302 configured to calculate an approximation temperature change rate based on detection results from the plurality of temperature detectors 104c to calculate the temperature of the target lens 110 by interpolation.

The temperature detector 104a configured to detect a temperature of, or close to, the outside air, the temperature detector 104b configured to detect a point close to the target lens 110, and the temperature detectors 104c configured to detect temperatures at points to which it takes time for heat inside a lens apparatus 301 to be transferred are provided. In this embodiment, the plurality of temperature detectors 104c are configured to grasp temperature transfer inside the lens apparatus 301. At this time, it is desired that each temperature detector 104c be placed at a point with low correlation between the other temperature detectors 104c and the temporal progression of the temperature change rate. When the number of temperature detectors 104c is increased to acquire various kinds of data of the temporal progression of the temperature change rate, the temperature transfer inside the lens apparatus 301 can be appropriately grasped, and temperatures of a plurality of target lenses 110 can be estimated. In a case where there are a plurality of lenses having high focus deviation sensitivity to the temperature change, when temperatures of the plurality of target lenses 110 are grasped, accuracy of focus deviation correction can be increased.

In Embodiment 3, a temperature change rate $\beta_i(t)$ is calculated in advance for each placement position of the temperature detector 104b and the temperature detectors 104c (i=1, 2, . . . ). With the use of the temperature change rates $\beta_i(t)$ at the plurality of points, an approximation temperature change rate "ε(t)" for approximating a temperature change rate "γ(t)" of the target lens 110 at the time "t" is generated. The approximation temperature change rate "ε(t)" is a function expressed by Expression (4), and an approximation coefficient $C_i$ corresponding to the temperature change rate $\beta_i(t)$ is calculated by the least squares method, for example, so that the approximation temperature change rate "ε(t)" becomes an approximation curve of the temperature change rate "γ(t)". With the above-mentioned configuration, a temperature correction coefficient "$k_c(t)$" expressed by Expression (5) is calculated.

$$\epsilon(t) = C_1 \times \beta_1(t) + C_2 \times \beta_2(t) + \quad (4)$$

$$k_c(t) = \frac{\epsilon(t) - \gamma(t)}{\alpha} \quad (5)$$

Next, with the use of the above-mentioned temperature correction coefficient "$k_c(t)$", a method of estimating the temperature of the target lens 110 under an environment in which the lens apparatus 301 is to be actually used is described.

A temperature change rate at the placement position of the temperature detector 104a at the time "t" is represented by "$\alpha_m(t)$", and a temperature change rate at the placement positions of the temperature detector 104b and the temperature detectors 104c at the time "t" is represented by "$\beta_{m\_i}(t)$". A correction value for the temperature change rate, which is calculated based on the approximation coefficient $C_i$ and the temperature change rate "$\beta_{m\_i}(t)$", is defined as an approximation temperature change rate "$\epsilon_m(t)$", and is expressed by Expression (6).

$$\epsilon_m(t) = C_1 \times \beta_{m_1}(t) + C_2 \times \beta_{m_2}(t) \quad (6)$$

Based on the temperature correction coefficient "$k_c(t)$", the approximation temperature change rate "$\epsilon_m(t)$", and the temperature change rate "$\alpha_m(t)$", the temperature T(t) of the target lens 110 at the time "t" is calculated by Expression (7).

$$T(t) = \int (\epsilon_m(t) - \alpha_m(t) \times k_c(t)) dt + T_0 \quad (7)$$

When the approximation temperature change rate "$\epsilon(t)$" and the temperature change rate "$\gamma(t)$" of the target lens 110 make a good match, the following is established in Expression (7).

$$\epsilon_m(t) >> \alpha_m(t) \times k_c(t)$$

In order to reduce the computational load, the temperature correction coefficient "$k_c(t)$" may be ignored.

A method of calculating the temperature of the target lens 110 with the above-mentioned configuration is described. The controller 302 selects the approximation coefficient $C_i$ corresponding to the temperature change rate "$\alpha_m(t)$", and calculates the approximation temperature change rate "$\epsilon_m(t)$" with the temperature change rate "$\beta_{m\_i}(t)$" by Expression (6). Further, the controller 302 calculates the temperature of the target lens 110 by Expression (7) with the use of the temperature correction coefficient "$k_c(t)$" expressed by Expression (5), the approximation temperature change rate "$\epsilon_m(t)$" expressed by Expression (6), and the temperature change rate "$\alpha_m(t)$".

The temperature change rate "$\alpha_m(t)$" of the ambient temperature is changed in reality. Therefore, in order to increase approximation accuracy of the approximation temperature change rate "$\epsilon(t)$" for various temperature change rates "$\alpha$" of the ambient temperature, a range of the temperature change rates "$\alpha$" of the ambient temperature is divided into areas, and the approximation coefficient $C_i$ corresponding to each area is used. At this time, the approximation coefficient $C_i$ is calculated under a plurality of conditions with different temperature change rates "$\alpha$" of the ambient temperature. An example of the approximation coefficient $C_i$ is described. As illustrated in FIG. 7, each approximation coefficient $C_i$ is determined in advance for different temperature change rates "$\alpha$" of, for example, 45° C./h, 35° C./h, and 25° C./h. For example, the temperature change rate "$\alpha_m(t)$" of the present ambient temperature of 22° C./h corresponds to Area C, and approximation coefficients $C_{1,C}$ and $C_{2,C}$ determined when "$\alpha$" was 25° C./h are used.

Figure 8:
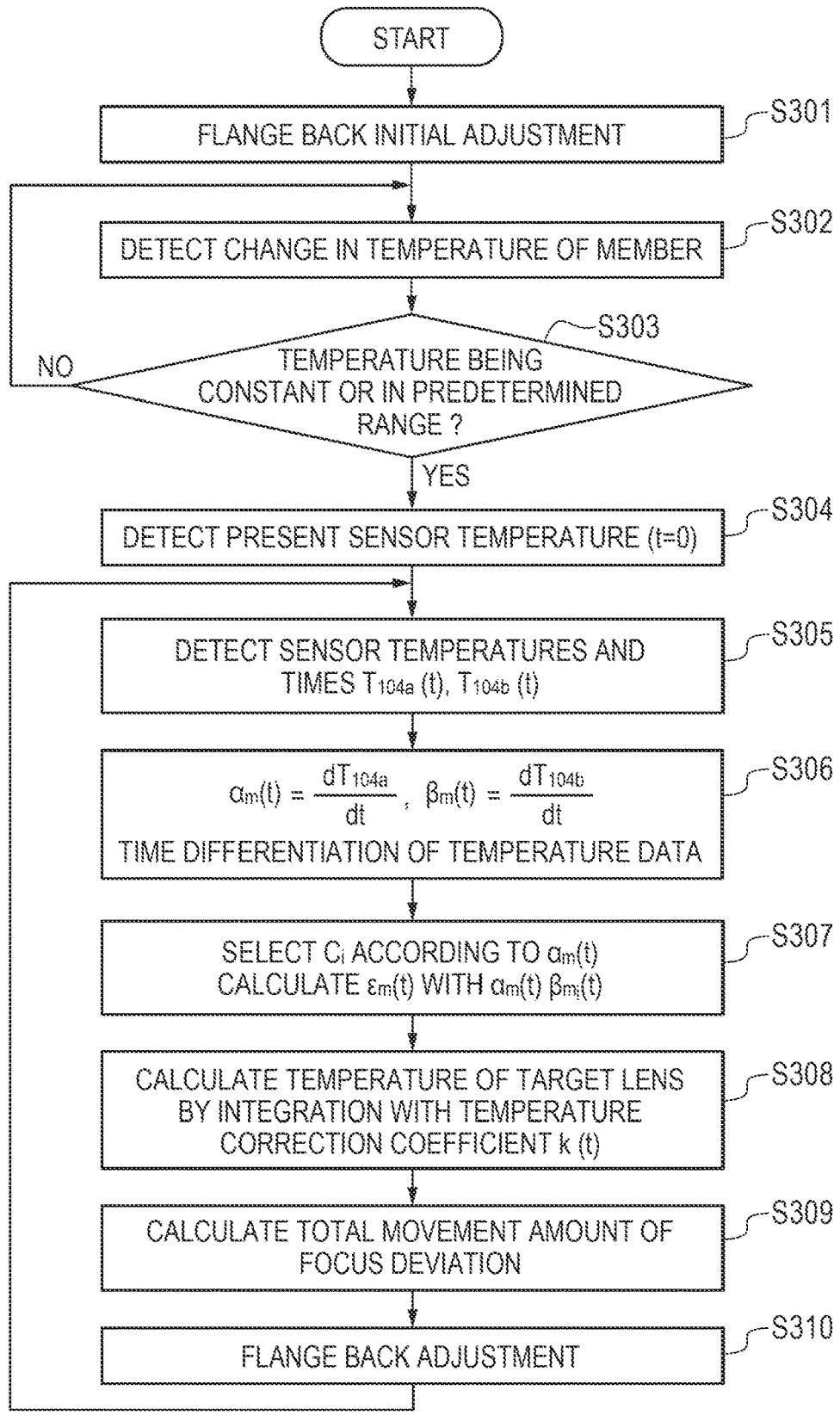
FIG. 8 is a flow chart for illustrating a flow of focus deviation correction processing in Embodiment 3.

Now, with reference to FIG. 8, a function of estimating the temperature of the target lens 110 at the given time "t" based on the above-mentioned temperature correction coefficient "$k_c(t)$" and the temperatures detected by the temperature detectors 104 for the flange back adjustment is described. Steps S301 to S306 are the same as in Embodiment 1 and a description thereof is omitted. In Step S307, the controller 302 selects the approximation coefficient $C_i$ corresponding to the temperature change rate "$\alpha_m(t)$", and calculates the approximation temperature change rate "$\epsilon_m(t)$" with the temperature change rate "$\beta_{m\_i}(t)$" by Expression (6). In Step S308, the controller 302 calculates the temperature of the target lens 110 by Expression (7) with the use of the temperature correction coefficient "$k_c(t)$" expressed by Expression (5), the approximation temperature change rate "$\epsilon_m(t)$" expressed by Expression (6), and the temperature change rate "$\alpha_m(t)$". The processing of Steps S309 and S310 is the same as in Embodiment 1, and a description thereof is omitted.

In Embodiment 3, the temperature change rate to be used is interpolated based on the data acquired from the plurality of temperature detectors 104 to enable temperature estimation of the plurality of target lenses 110.

Embodiment 4

Now, a lens apparatus 401 according to Embodiment 4 of the present invention is described. Matters not referred to here are the same as in Embodiment 1 to Embodiment 3, and a description thereof is omitted. The lens apparatus 401 includes a fluctuation detector 202 in addition to the lens apparatus 301. Expression (8) obtained by replacing the temperature change rate "$\beta_m(t)$" and the temperature correction coefficient "$k(t)$" in Expression (3) of Embodiment 2 with the approximation temperature change rate "$\epsilon_m(t)$" and the temperature correction coefficient "$k_c(t)$", respectively, is used to calculate the temperature of the target lens 110.

$$T(t) = \Sigma_{i=0} \int_{\tau_i}^{\tau_{i+1}} (\epsilon_m(t) - \alpha_m(t) \times k_C(t - \tau_i)) dt + T_0 \quad (8)$$

When a change in temperature change rate is detected, the above-mentioned temperature correction coefficient "$k_c(t)$" is changed to a temperature correction coefficient "$k_c(t)$" suitable for the temperature change rate of the present ambient temperature. Further, the above-mentioned approximation coefficient $C_i$ is switched to a value corresponding to the temperature change rate "$\alpha_m(t)$" of the ambient temperature. In Expression (8), i+1 is substituted for "i" to update the integration interval. The integration operation is performed with the use of the changed temperature correction coefficient "$k_c(t)$" to calculate the temperature of the target lens 110.

In Embodiment 4, through appropriate reflection of the change in temperature change rate of the ambient temperature as needed, when the temperature change rate of the ambient temperature is changed significantly, accurate temperature estimation can be performed.

Embodiment 5

Figure 9:
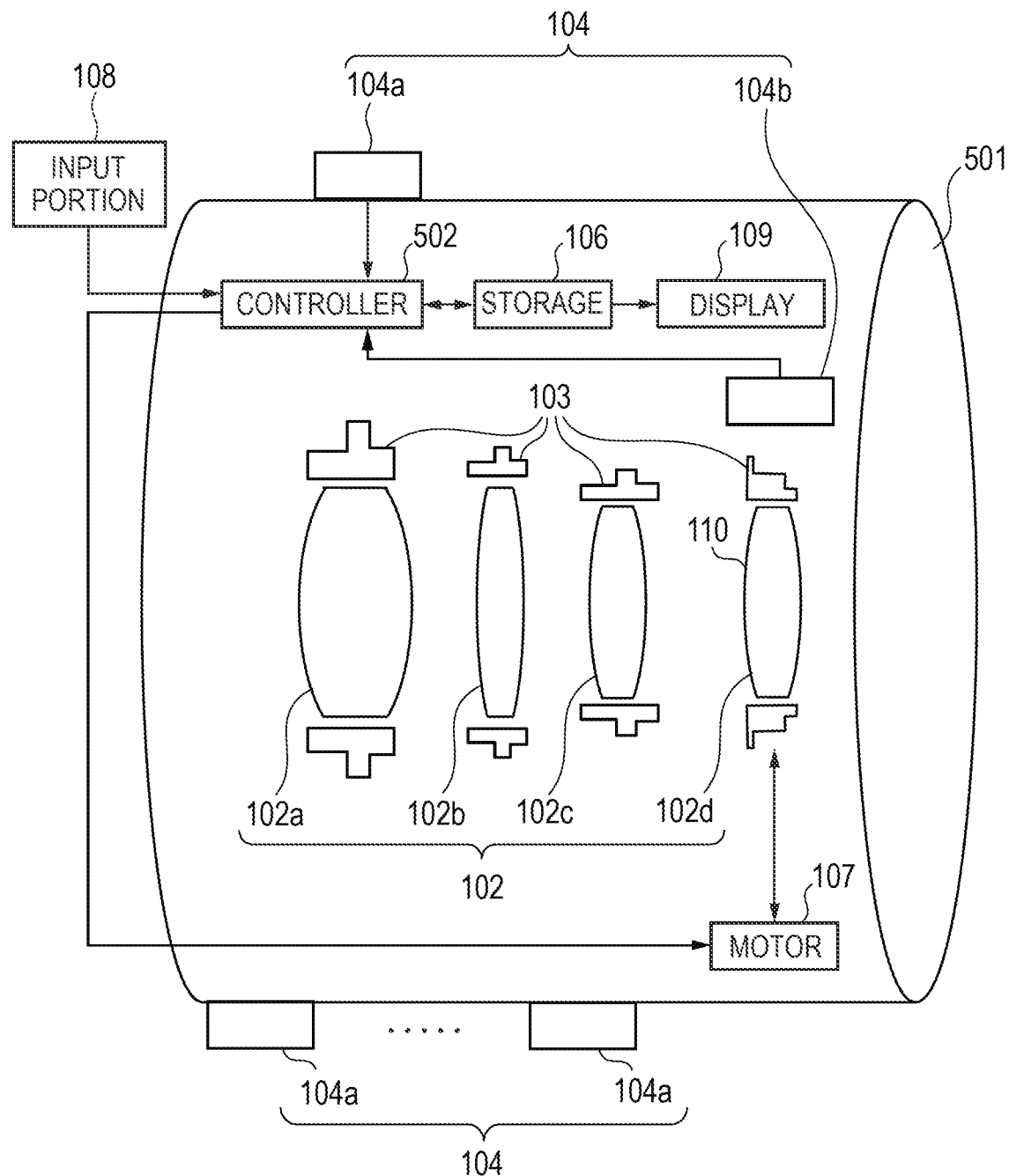
FIG. 9 is a diagram for illustrating a configuration example of a lens apparatus according to Embodiment 5 of the present invention.

Now, with reference to FIG. 9, a lens apparatus 501 according to Embodiment 5 of the present invention is described. Matters not referred to here are the same as in the first to fourth embodiments, and a description thereof is omitted.

Temperature detectors 104a configured to detect temperatures of, or points close to, the outside air are placed at a plurality of points to detect a temperature near a surface of the lens apparatus 501. Through the detection of the ambient temperatures at the plurality of points in a distributed manner, it is possible to adapt to a change in how heat is transferred to the inside of the lens apparatus 501. In order to detect a wide range of situations in the lens apparatus 501, it is desired that the temperature detectors 104a be placed at positions apart from one another. The lens apparatus 501 further includes a controller 502 configured to calculate the temperature of the target lens 110 with a correction term according to a distance to the target lens 110 and susceptibility to the temperature change for a point at which the temperature change is unbalanced based on detection results from the plurality of temperature detectors 104a. The controller 502 is further configured to calculate, in addition to the function of any one of the controller 105 and the controller 302, the temperature of the target lens 110 in consideration of the above-mentioned imbalance in temperature change.

A method of estimating the temperature with the above-mentioned configuration is described. Temperatures detected at a plurality of points close to the surface of the lens apparatus 501 or the temperature change rates are compared with one another to detect partial imbalance in temperature change. When the temperatures close to the surface of the lens apparatus 501 are not uniform, the temperature data acquired from the temperature detectors 104a placed at the plurality of points is different at some points. To address this problem, based on the temperature change rates "$\alpha_m(t)$" of the ambient temperatures calculated from the temperature detectors 104a placed at the plurality of points, a plurality of temperature results are calculated for the same target lens 110 with the use of the method in any one of Embodiment 1 to Embodiment 4. For the point at which the temperature change is unbalanced, an accurate temperature of the target lens 110 is calculated based on the plurality of temperature results with the correction term according to the distance of the placement positions of the temperature detectors 104a to the target lens 110 and the susceptibility to the temperature change.

In Embodiment 5, through reflection of the imbalance in temperature change to the method of estimating the temperature, even when the temperature of the lens apparatus 501 is not changed uniformly due to sunlight or a spotlight or other heat sources, accurate temperature estimation of the target lens 110 can be performed.

The correction of the focus deviation due to the temperature change has been described above, but is merely given as an example. The scope of the present invention is not limited thereto, and the above-mentioned configuration may be changed as appropriate. When imaging characteristics (including at least one of magnification, distortion, spherical aberration, astigmatism, curvature of field, and other wavefront aberrations) of the lens are changed by the temperature change, correction may be performed with the use of the estimated temperature. The estimated temperature can be used for other uses. For example, the estimated temperature may be used in correcting a change in zoom position or a change in aperture diameter of a diaphragm device caused by the temperature change. Further, the estimated temperature may be used in determining whether condensation has occurred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The exemplary embodiments of the present invention are described above, but the present invention is not limited to these embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-222455, filed Nov. 28, 2018, which is hereby incorporated by reference herein in its entirety.

What is claimed is:
1. A lens apparatus comprising:
a lens;
a first detector configured to detect a first temperature as a temperature of one of an outside or an outer peripheral surface of the lens apparatus;
a second detector configured to detect a second temperature as a temperature of an inside of the lens apparatus;
a processor configured to obtain a first temperature change rate as a change amount of the first temperature per unit time, and a second temperature change rate as a change amount of the second temperature per unit time, to estimate a temperature of the lens based on the first temperature change rate and the second temperature change rate; and
a storage configured to store, with respect to the first temperature change rate, a correction coefficient which is used as a function of time and previously obtained by normalizing, with the first temperature change rate, a difference between a lens temperature change rate as a change amount of a temperature of the lens per unit time and the second temperature change rate, wherein the processor is configured to estimate the temperature of the lens based on the first temperature change rate, the second temperature change rate, and the correction coefficient.

2. The lens apparatus according to claim 1,
wherein the storage is configured to store the correction coefficient with respect to each magnitude of the first temperature change rate, and
wherein the processor is configured to estimate the temperature of the lens based on the correction coefficient corresponding to a magnitude of the first temperature change rate.

3. The lens apparatus according to claim 1,
wherein the second detector includes a plurality of detectors configured to detect temperatures at a plurality of points in the lens apparatus, respectively,
wherein the storage is configured to store the correction coefficient based on the temperatures at the plurality of points, and
wherein the processor is configured to estimate the temperature of the lens based on the first temperature change rate, the second temperature change rate with respect to each of the plurality of detectors, and the correction coefficient based on the temperatures at the plurality of points.

4. The lens apparatus according to claim 1, further comprising a lens unit configured to correct defocus of the lens apparatus,
wherein the processor is configured to obtain a drive amount of the lens unit based on the estimated temperature of the lens.

5. A method of estimating a temperature of a lens in a lens apparatus, the method comprising:
detecting a first temperature as a temperature of one of an outside or an outer peripheral surface of the lens apparatus;
detecting a second temperature as a temperature of an inside of the lens apparatus;
obtaining a first temperature change rate as a change amount of the first temperature per unit time, and a second temperature change rate as a change amount of the second temperature per unit time, to estimate the temperature of the lens based on the first temperature change rate and the second temperature change rate;
storing, with respect to the first temperature change rate, a correction coefficient which is used as a function of time and previously obtained by normalizing, with the first temperature change rate, a difference between a lens temperature change rate as a change amount of a temperature of the lens per unit time and the second temperature change rate; and
estimating the temperature of the lens based on the first temperature change rate, the second temperature change rate, and the temperature correction coefficient.

6. The method according to claim 5, wherein
the correction coefficient is stored for each magnitude of the first temperature change rate; and
the temperature of the lens is estimated based on the correction coefficient corresponding to a magnitude of the first temperature change rate.

7. The method according to claim 5,
wherein detecting the second temperature includes detecting temperatures at a plurality of points in the lens apparatus,
wherein the temperature correction coefficient is stored based on the temperatures at the plurality of points, and
wherein the method estimates the temperature of the lens based on the first temperature change rate, the second temperature change rate with respect to each of the plurality of points, and the correction coefficient based on the temperatures at the plurality of points.

8. A computer-readable storage medium which stores a program for causing a computer to execute a method of estimating a temperature of a lens in a lens apparatus, the method comprising:
detecting a first temperature as a temperature of one of an outside or an outer peripheral surface of the lens apparatus;
detecting a second temperature as a temperature of an inside of the lens apparatus;
obtaining a first temperature change rate as a change amount of the first temperature per unit time, and a second temperature change rate as a change amount of the second temperature per unit time, to estimate the temperature of the lens based on the first temperature change rate and the second temperature change rate;
storing, with respect to the first temperature change rate, a correction coefficient which is used as a function of time and previously obtained by normalizing, with the first temperature change rate, a difference between a lens temperature change rate as a change amount of a temperature of the lens per unit time and the second temperature change rate; and
estimating the temperature of the lens based on the first temperature change rate, the second temperature change rate, and the temperature correction coefficient.

* * * * *